United States Patent
Hight

(10) Patent No.: US 9,839,935 B2
(45) Date of Patent: Dec. 12, 2017

(54) SATELLITE PAINT WASTE RECOVERY SYSTEM

(71) Applicant: Jerry Leon Hight, Wapakoneta, OH (US)

(72) Inventor: Jerry Leon Hight, Wapakoneta, OH (US)

(*) Notice: Subject to any disclaimer, the term of this patent is extended or adjusted under 35 U.S.C. 154(b) by 0 days.

(21) Appl. No.: 14/983,702

(22) Filed: Dec. 30, 2015

(65) Prior Publication Data

US 2017/0189933 A1    Jul. 6, 2017

(51) Int. Cl.
  *B05D 1/00*   (2006.01)
(52) U.S. Cl.
  CPC ...................... *B05D 1/00* (2013.01)
(58) Field of Classification Search
  CPC .................... B05D 1/00; B05D 1/36
  See application file for complete search history.

(56) References Cited

U.S. PATENT DOCUMENTS

| | | | | |
|---|---|---|---|---|
| 6,077,354 A | * | 6/2000 | Kaneski | B05B 12/08 118/664 |
| 2003/0064163 A1 | * | 4/2003 | Uenoyama | B05B 15/127 427/345 |

* cited by examiner

*Primary Examiner* — Dah-Wei D Yuan
*Assistant Examiner* — Kristen A Dagenais
(74) *Attorney, Agent, or Firm* — MacMillan, Sobanski & Todd, LLC

(57) ABSTRACT

A satellite paint waste recovery system for a painting system which reduces hazardous waste generation, providing instead a plurality of solvent mixes which are reusable by the painting system. The satellite paint waste recovery system employs a method of capturing reusable solvent when changing paint colors in the painting system which includes flushing a discrete color of paint loaded in the painting system with fresh solvent and capturing the discrete color of paint flushed and some of the flushing solvent as a discrete color solvent mix in a discrete container each time the paint color sought to be used in the painting system is changed. The discrete color of solvent mix can subsequently be reused to thin a new container of paint instead of using new solvent.

20 Claims, 3 Drawing Sheets

SATELLITE PAINT WASTE RECOVERY SYSTEM

DETAILED DESCRIPTION OF THE INVENTION

Figure 1:
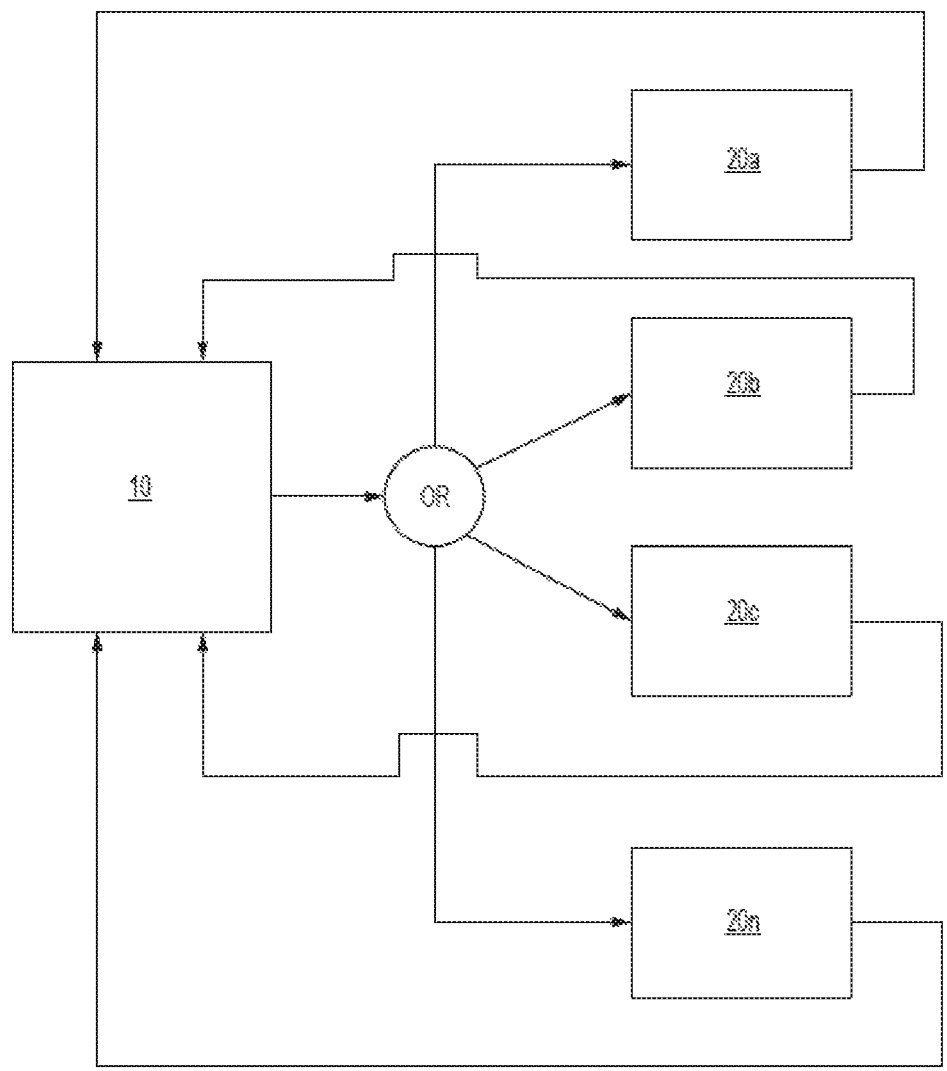
FIG. 1 is a block diagram showing flow of solvent portions through a satellite paint waste recovery system in accordance with the present invention.

Referring now to the drawings and in particular FIG. 1, a satellite paint waste recovery system employs a method of capturing reusable solvent when changing paint colors in a painting system 10, such as a commercial or industrial drive-in booth or automated or mechanized multi-color paint coating system. The method of capturing reusable solvent contemplates the use of a painting system 10 operative to use a plurality of discrete quantities of paints, a quantity of fresh solvent which will be deployed into a plurality of discrete quantities of reusable solvent mixes, and a plurality of discrete solvent containers 20a, 20b, 20c, 20n (collectively referred to herein as "20").

In accordance with the present invention, it is contemplated that the painting system 10 may define any commercial or industrial drive-in booth or automated or mechanized multi-color paint coating system. Accordingly, the painting system 10 may include paint lines, tubing, spray guys, and paint spray heads in the spraying equipment.

In addition, it is appreciated that each discrete quantity of paint defines a defined and distinct color of paint and each of the discrete quantities of reusable solvent mix corresponds to one of the colors of paint, representing a mixture of solvent and a particular color of flushed paint.

It is further appreciated that each of the solvent containers 20 is operative to receive a single corresponding color of solvent mix from the painting system 10, keep its discrete color of solvent mix separated from the other discrete colors of solvent mix, and avail its discrete color of solvent mix back to the painting system 10 for reuse.

In the preferred embodiment, each solvent container 20 defines a 30 gallon drum and is labeled with the color of its solvent mix. All solvent containers 20 are further labeled "Recycled" or "Reused." While the solvent containers may be kept in the satellite waste accumulation area, it is noted that such small volumes of hazardous waste are deemed conditionally exempt from many EPA regulations.

For instance, if a first quantity of paint were the blue paint, a first quantity of solvent mix would be the blue solvent mix, and a first solvent container 20a would be the blue solvent container, labeled "Blue Recycled Solvent." If a second quantity of paint were the red paint, a second quantity of solvent mix would be the red solvent mix, and a second solvent container 20b would be the red solvent container, labeled "Red Recycled Solvent." If a third quantity of paint were the yellow paint, a third quantity of solvent would be the yellow solvent and a third solvent container 20c would be the yellow solvent container, labeled "Yellow Recycled Solvent." It is understood, however, that the satellite paint waste recovery system may include as many quantities of paints, corresponding quantities of solvent mix, and corresponding solvent containers as required by the specific painting system.

Figure 2:
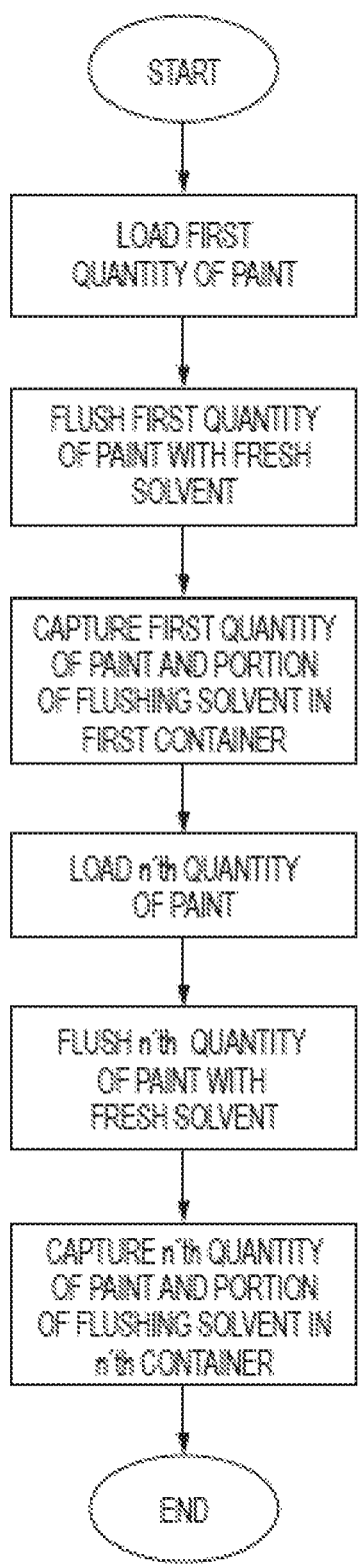
FIG. 2 shows the process through which solvent is captured and reused in a satellite paint waste recovery system in accordance with the present invention.
Figure 3:
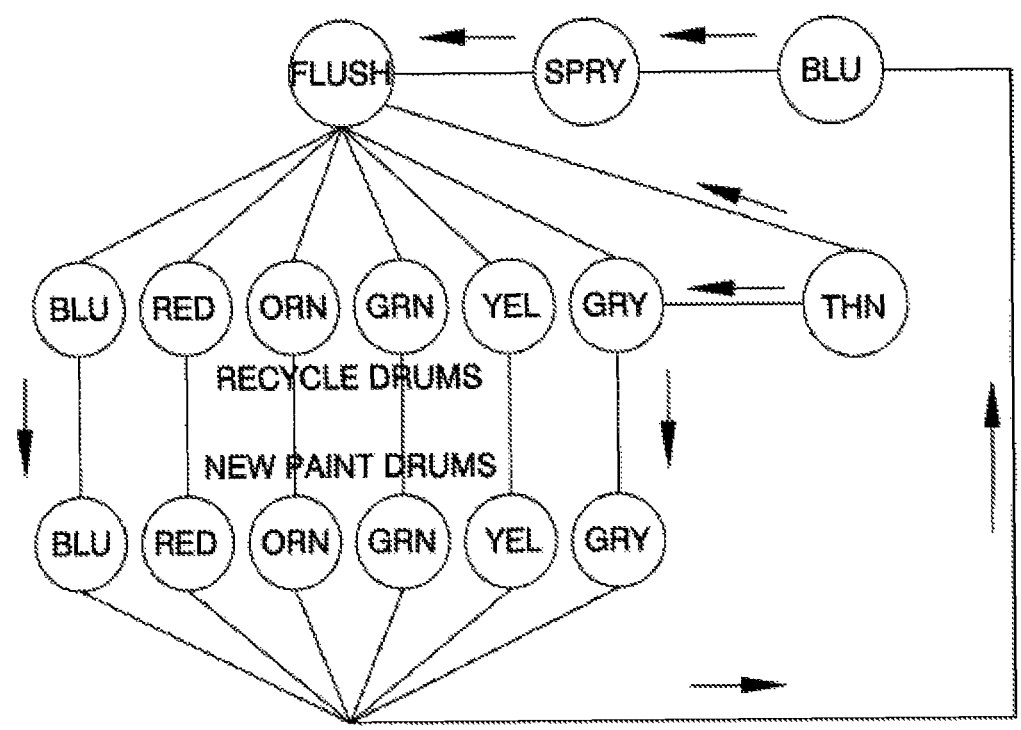
FIG. 3 shows a flow chart representation of the flow of paint and solvent between the spray system and the recycling and new paint drums.

Referring now to FIG. 2, the method of capturing reusable solvent when changing paint colors in a paint system begins with the loading a first quantity of paint into a selected painting system. Once the first quantity of paint is loaded, an operator may use the loaded first quantity of paint to painting in accordance with the customary operation of the selected painting system.

Once the operator was finished painting with the first quantity of paint, the first quantity of paint must be removed from the painting system to allow for the use of another quantity of paint. Thus, the operator next flushes the painting system with a first amount of fresh, unused solvent (from the quantity of fresh solvent), capturing a first quantity of solvent mix in a first solvent container. It is contemplated that the first quantity of solvent mix defines the first quantity of paint remaining in the system and being flushed out as well as part of the first amount of fresh solvent.

It is understood that the first amount of fresh solvent defines a suitable amount of solvent for flushing paint from the painting system that is in use in accordance with conventional paint flushing techniques. Moreover, in accordance with such conventional paint flushing techniques, it is appreciated that some of the first amount of fresh solvent will remain behind in the painting system once the first quantity of paint has been fully flushed from the painting system.

The operator continues by loading a second quantity of paint into the painting system, thereby pushing the remainder of the first amount of fresh solvent into a second solvent container. The operator may then continue painting, using the second quantity of paint. Once the operator was finished painting with the second quantity of paint, the operator proceeds to flush the painting system with a second quantity of fresh solvent, capturing a second quantity of solvent mix in a second solvent container. Similar to the first quantity of solvent mix, the second quantity of solvent mix defines the remainder of the second quantity of paint and part of the second amount of solvent. The operator can then continue by loading a third quantity of paint into the painting system, pushing the remainder of the second amount of fresh solvent into a third solvent container, painting with the third quantity of paint, and so on.

For instance, a technician may load blue paint into the painting system, paint with the blue paint until finished, flush the painting system with unused solvent, and capture all of the blue paint and a portion of the flushing solvent from the system as a blue solvent mix in a blue solvent container. At this point the system would be full of unused solvent.

The technician can then connect red paint to the painting system, push the unused solvent remaining in the system with the red paint into a red solvent container, paint with the red paint until finished, flush the painting system with unused solvent, and capture all of the red paint and a portion of the flushing solvent from the system as a red solvent mix in the red solvent container. At this point the system would be again full of unused solvent.

The technician can then connect yellow paint to the painting system, push the unused solvent remaining in the system with the yellow paint into a yellow solvent container, paint with yellow paint until finished, flush the painting system with unused solvent, and capture all of the yellow paint and a portion of the flushing solvent from the system as a yellow solvent mix in the yellow solvent container. At this point the system would be full of unused solvent. This process can then be repeated for each color of paint which is used.

Advantageously, whenever new paint is required, the technician can use the appropriate recycled color solvent mix to thin or reduce the viscosity of a new container of paint instead of using new solvent. Therefore, fresh, unused solvent is only required for flushing the paint system. Moreover, since the solvent mixes are not stored together in the same satellite waste containers, but are stored separately in the satellite recycle containers, they have been recovered from the waste stream and may be reused. The fresh solvent has effectively been interlaced back into the system as a solvent mix through a plurality of seamless integrations, and no hazardous wastes are generated.

It is appreciated that the method of capturing reusable solvent when changing paint colors may comprise as many iterations of the aforementioned process as required by the specific painting system and application in which it is deployed.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A method of capturing reusable solvent when changing paint colors, comprising the steps of:
    providing a painting system operative to apply a single color of paint to an object at a given time, wherein said painting system is configured to apply a first quantity of paint which corresponds to a first distinct color;
    flushing the first quantity of paint completely from said painting system with a first amount of fresh solvent;
    capturing a first solvent mix in a first discrete solvent container, wherein said first solvent mix includes the flushed first quantity of paint and a first portion of the first amount of fresh solvent; and
    loading a second quantity of paint which corresponds to a second distinct color so as to configure said painting system to apply the second quantity of paint, wherein the step of loading flushes a second portion of the first amount of fresh solvent in the painting system into a second discrete solvent container.

2. The method of claim 1, additionally comprising the steps of:
    flushing the second quantity of paint completely from said painting system with a first portion of a second amount of fresh solvent; and
    capturing a second solvent mix in the second discrete solvent container, wherein said second solvent mix includes the second portion of the first amount of fresh solvent, the flushed second quantity of paint, and the first portion of the second amount of fresh solvent.

3. The method of claim 1, wherein the painting system defines a paint sprayer applicator and said first solvent mix thins or reduces the viscosity of a new container of paint for use in the painting system.

4. A method of capturing reusable solvent when changing paint colors, comprising the steps of:
    providing a painting system operative to apply a single color of paint to an object at a given time;
    loading a first quantity of paint which corresponds to a first distinct color into said painting system so as to configure the painting system to apply the first quantity of paint;
    flushing the first quantity of paint completely from said painting system with a first amount of fresh solvent;
    capturing a first solvent mix in a first discrete solvent container, wherein said first solvent mix includes the flushed first quantity of paint and a first portion of the first amount of fresh solvent;
    loading a second quantity of paint which corresponds to a second distinct color so as to configure said painting system to apply the second quantity of paint, wherein loading the second quantity of paint flushes a second portion of the first amount of fresh solvent;
    capturing the second portion of the first amount of fresh solvent in a second discrete solvent container;
    flushing the second quantity of paint completely from said painting system with a first portion of a second amount of fresh solvent; and
    capturing a second solvent mix in the second discrete solvent container, wherein said second solvent mix includes the flushed second quantity of paint the first portion of the second amount of fresh solvent.

5. The method of claim 4, wherein the painting system defines a paint sprayer applicator and said first solvent mix thins or reduces the viscosity of a new container of paint for use in the painting system.

6. The method of claim 4, wherein the second portion of the first amount of fresh solvent, the flushed second quantity of paint, and the first portion of the second amount of fresh solvent captured in the second discrete container are mixed in a new container of paint corresponding to the second distinct color.

7. The method of claim 6, wherein a direct connection is provided between the second discrete container and the new container of paint corresponding to the second distinct color.

8. The method of claim 2, further comprising the step of mixing the second solvent mix with a fresh amount of paint corresponding to the second distinct color.

9. The method of claim 2, further comprising storing mixture of a third amount of solvent and a third quantity of paint corresponding to a third distinct color a third discrete solvent container.

10. The method of claim 9, further comprising the step of selectively mixing the contents of the first, second, and third discrete solvent containers respectively with paint of the first, the second, or a third distinct color.

11. The method of claim 9, further comprising the steps of:
    connecting the first discrete solvent container to a first container of new paint corresponding to the first distinct color;
    connecting the second discrete solvent container to a second container of new paint corresponding to the second distinct color; and
    connecting the third discrete solvent container to a third container of new paint corresponding to the third distinct color.

12. A method of capturing solvent, comprising the sequential steps of:
    loading a first quantity of paint which corresponds to a first distinct color into a painting system so as to configure the painting system to apply the first quantity of paint;
    loading a first quantity of solvent into the painting system, wherein the step of loading flushes the first quantity of paint from the painting system;

capturing a first solvent mix in a first discrete container, wherein said first solvent mix includes the flushed first quantity of paint and a first portion of the first quantity of solvent;

loading a second quantity of paint which corresponds to a second distinct color into the painting system so as to configure the painting system to apply the second quantity of paint, wherein the step of loading the second quantity of paint flushes a second portion of the first quantity of solvent from the painting system;

capturing the flushed second portion of the first quantity of solvent in a second discrete container until the remaining second portion of the first quantity of solvent is flushed from the painting system;

loading a second quantity of solvent into the painting system, wherein the step of loading flushes the second quantity of paint from the painting system;

capturing the flushed second quantity of paint and a first portion of the second quantity of solvent in the second discrete container, wherein the second discrete container contains a second solvent mix comprising:
the second portion of the first quantity of solvent;
the flushed second quantity of paint; and
the first portion of the second quantity of solvent.

13. The method of claim 12, further comprising the sequential step of:
mixing the first solvent mix with a new quantity of paint that corresponds to the first distinct color.

14. The method of claim 12, further comprising the sequential step of:
mixing the second solvent mix with a new quantity of paint that corresponds to the second distinct color.

15. The method of claim 12, further comprising the sequential step of:
thinning a new quantity of paint that corresponds to the first distinct color by adding the first solvent mix to the new quantity of paint that corresponds to the first distinct color.

16. The method of claim 15, further comprising the sequential step of:
thinning a new quantity of paint that corresponds to the second distinct color, by adding the second solvent mix to the new quantity of paint that corresponds to the second distinct color.

17. The method of claim 12, wherein the loading and capturing steps are performed without electro-mechanical or electrical devices.

18. The method of claim 12, wherein the sequential steps are performed without filtering the solvent mixes by reintroducing the solvent mixes to thin or reduce the viscosity of paints that correspond to distinct colors.

19. The method of claim 12, further comprising storing a mixture of a third amount of solvent and a third quantity of paint corresponding to a third distinct color in a third discrete solvent container.

20. The method of claim 19, further comprising the steps of:
connecting the first discrete solvent container to a first container of new paint corresponding to the first distinct color;
connecting the second discrete solvent container to a second container of new paint corresponding to the second distinct color; and
connecting the third discrete solvent container to a third container of new paint corresponding to the third distinct color.

* * * * *